(31.)

JOHN A. TOPLIFF & GEORGE H. ELY.

Improvement in Connecting Carriage Springs.

No. 122,079.

Patented Dec. 19, 1871.

Witnesses.
T. B. Hammond
Geo. P. Metcalf

Inventors.
John A. Topliff
Geo. H. Ely

*Reissued Apl. 9th 1872.*

122,079

UNITED STATES PATENT OFFICE.

JOHN A. TOPLIFF AND GEORGE H. ELY, OF ELYRIA, OHIO.

IMPROVEMENT IN CONNECTING CARRIAGE-SPRINGS.

Specification forming part of Letters Patent No. 122,079, dated December 19, 1871.

*To all whom it may concern:*

Be it known that we, JOHN A. TOPLIFF and GEORGE H. ELY, of Elyria, in the county of Lorain and State of Ohio, have invented certain Improvements in Connecting Carriage-Springs, of which the following is a specification:

The nature and object of this invention are to so connect the springs on a carriage or other vehicle that they act together—that is, the motion up or down of either shall be conveyed to the other, thereby dividing the strain and preventing either side of the carriage from being depressed more than the other.

Figure 1:
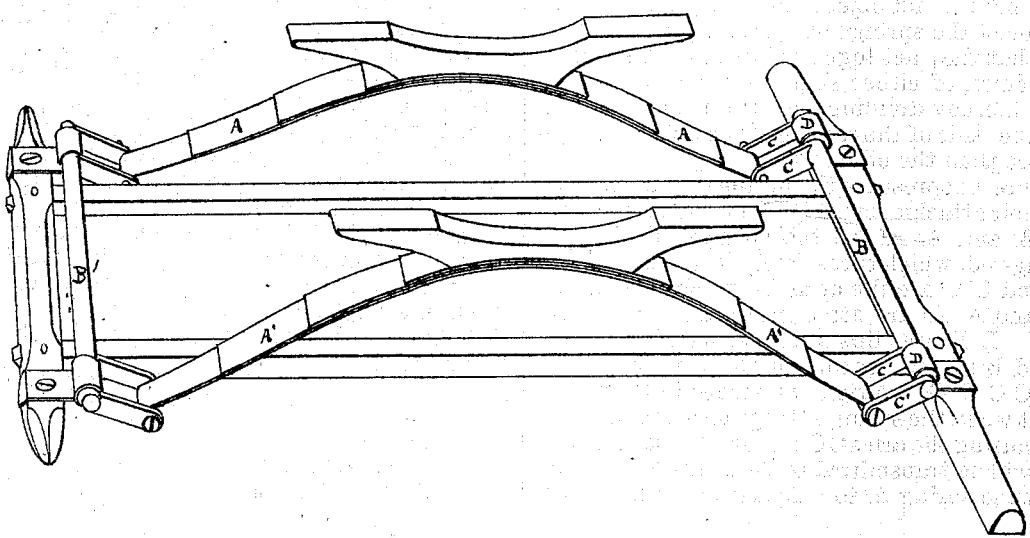
Figure 2:
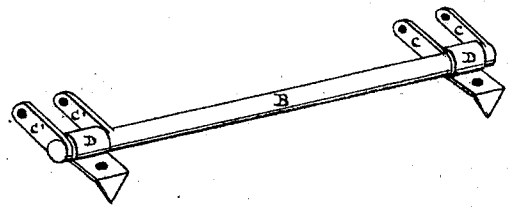

Figure 1 represents the springs of a carriage and their attachments, Fig. 2 the connecting-rod.

A A and A' A' are the springs; B, the connecting-rod, which turns freely in the clips D D. C C and C' C' are the arms by which the springs A A and A' A' are attached to the connecting-rod B. D D are clips which attach the connecting-rod B to the gearing of the carriage. The arms C C C' C' are rigidly fastened to the rod B, so that when the spring A lengthens or contracts, thus causing the arms C C to move, the same movement will be transmitted to the arms C' C', which will cause spring A' to lengthen or contract likewise, and vice versa. It will be observed that the position of each rock-rod B B' is just in front of each axle and secured by the clips D; and that the arms C C C' C' are fixed to said rock-rods B B' on each side of said clips D; and that the springs A A' are secured between the inner ends of these arms so as to be braced laterally and allow both the front and rear ends of the springs to yield in unison with each other. By this arrangement the seat is allowed to yield in both directions without rolling; the position of the arms being always downward, those of each rock-rod, while moving together, can also move with each separate rod independent of the other.

What we claim is—

The arms C C C'C', arranged upon separate rock-rods B B', secured directly to the front and rear axles to cause both ends of each spring to yield simultaneously and in unison with each other, and also to be laterally braced by said rock-rods, as described.

JOHN A. TOPLIFF,
GEO. H. ELY.

Witnesses:
T. B. HAMMOND,
GEO. P. METCALF.

(31)